May 2, 1967 — K. E. HANKE — 3,316,892
REMOVABLE LINER FOR THE FIREBOWL OF BARBECUE APPARATUS
Filed Aug. 9, 1965
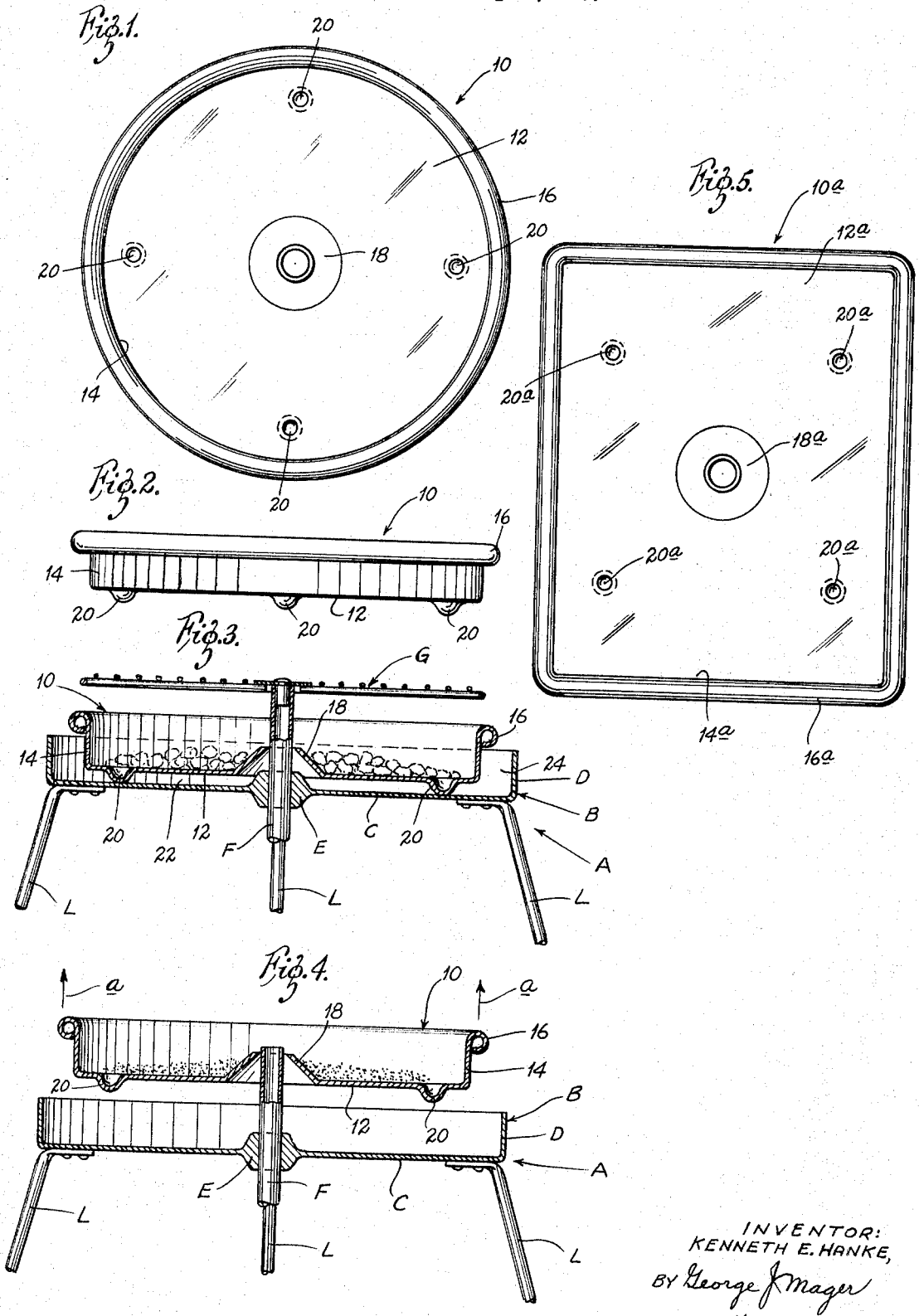
INVENTOR:
KENNETH E. HANKE,
BY George J. Mager
HIS ATTORNEY

United States Patent Office 3,316,892
Patented May 2, 1967

3,316,892
REMOVABLE LINER FOR THE FIREBOWL
OF BARBECUE APPARATUS
Kenneth E. Hanke, St. Louis County, Mo.
(4215 Tupelo Drive, St. Louis, Mo. 63125)
Filed Aug. 9, 1965, Ser. No. 478,379
1 Claim. (Cl. 126—25)

ABSTRACT OF THE DISCLOSURE

An accessory of pan-like configuration designed to protect the firebowl and associated components from heat and resultant damage; to render the apparatus less hazardous with respect to small children; to facilitate cleaning operations.

The present invention relates generally to a novel accessory device designed to eliminate, or at least mitigate some problems associated with what is today commonly referred to as "outdoor living." Stated more particularly, the present invention relates to a novel protective liner device for the firebowls of barbecue apparatus. As will appear hereinbelow, the liner of the present invention also provides many advantages over and above its primary or firebowl protection objective.

More and more Americans, especially of the younger generation, are becoming outdoor cooking-minded, so that barbecue equipment is, so to speak, becoming a necessity rather than a luxury for millions of people.

A very important component of most barbecue outfits comprises a brazier or firebowl wherein the burning coals are contained. The grill whereon the food to be treated is placed, overlies the firebowl, being disposed in a plane thereabove. Consequently, drippings from some of the foods being treated usually descend into the firebowl, and although most of them are consumed it frequently happens toward the end of the treating operation when the coals are smoldering, that such drippings tend to create a messy condition as is well understood.

Cleaning the firebowl for its next use is unfortunately a requisite chore that is customarily put off as long as possible. Inasmuch as the firebowl is usually an integrated part thereof, the entire barbecue apparatus must be up-ended for dumping, the ashes and other residue must be scraped out of the bowl, and so on. This can be an unwieldy operation particularly when, as frequently happens on picnics and other outings, a rainstorm suddenly appears, thus necessitating performance of the chore in a hurry. At any rate, whether the cleaning chore is done hurriedly or not, each time it is performed, some damage is usually inflicted on the apparatus.

Furthermore, because as earlier indicated, the firebowl is integrated with the remainder of the barbecue apparatus, much of the heat generated in said bowl is transmitted to adjacent components, thus increasing the hazard area for injury to small children as is understood. Also as should be evident, this transmitted heat has a deleterious effect on the painted or otherwise ornamented surfaces of said component.

The primary object of the present invention is to provide a simple device adapted to overcome the foregoing problems, and thus to render the enjoyment of outdoor cooking still more pleasurable.

To this end, the invention contemplates a pan-like liner, preferably not necessarily fabricated of steel, having a periphery similar to but preferably somewhat smaller than that of the firebowl wherefor it is designed. With the grill removed, the liner of the invention is readily insertable into the firebowl and removable therefrom. To facilitate these operations as will appear, the upper peripheral edge of said liner is comprised of an arcuate outwardly extending flange or annular bead that is integral with the side wall of the liner.

The side wall portion of the liner is vertically disposed, and extends upwardly from the generally flat bottom wall thereof. Centrally thereof, said bottom wall has formed therein a hollow upstanding frusto-conical segment adapted to loosely surround the centerpost of the apparatus and its bearing, when the liner is in place.

The bottom wall of the liner has furthermore formed therein a plurality or series of depending dimple formations, preferably but not necessarily equally spaced along an imaginary circular centerline radially inwardly of the vertical side wall portion of the liner.

Dimensionwise, the height of the liner would preferably be such that when in position within the firebowl and supported by means of the dimple formations that rest on the bottom wall thereof, the upper peripheral rim aforesaid would lie in a plane slightly above the top peripheral edge of said firebowl.

The invention is illustrated on a sheet of drawings that accompanies this specification, and a more comprehensive understanding of the features and advantages thereof may be had from the detailed description that follows with reference to said drawings, wherein:

FIGURE 1 is a top plan view of a circular liner embodiment of the present invention;

FIGURE 2 is a side elevational view thereof;

FIGURE 3 is a vertical, generally sectional view illustrating the liner of the present invention in place within the firebowl and below the grill member of an exemplary barbecue apparatus, the latter being only fragmentarily shown;

FIGURE 4 is a view similar to FIGURE 3, illustrating the removal of said liner subsequent to removal of the grill member; and FIGURE 5 is a top plan view of a non-circular liner embodiment of the present invention.

In the interest of clarity herein, numerical reference characters are employed to designate structure included in the present invention, whereas alphabetical reference characters are employed to designate the structure of a barbecue apparatus exemplarily shown in the drawings.

Thus, illustrated particularly in FIGURES 1 and 2, is a circular liner embodiment of the present invention generally designated by the numeral 10. The liner 10 includes a bottom wall 12 that merges into a circular upstanding vertical side wall 14. At the top, the side wall 14 terminates in an annular flange or brim portion 16, that as better seen in FIGURES 3 and 4, has an arcuate contour and extends outwardly and downwardly along the upper end portion of said side wall.

Centrally thereof, the bottom wall 12 has formed therein a hollow upstanding frusto-conical segment 18. Also formed in said bottom wall 12 of the liner 10, is a plurality of depending dimple formations each designated 20. Preferably but not necessarily as earlier indicated, the dimples 20 are equally spaced along an imaginary circular centerline that would be drawn radially inwardly of the vertical side wall 14 of the liner. Four dimples 20 are illustrated in the drawings, and from a manufacturing standpoint at least, such a number of them is deemed adequate.

In FIGURES 3 and 4, pertinent components of an exemplary barbecue apparatus, generally designated A, are illustrated. The principal component of said apparatus wherewith the present invention is concerned, is the firebowl B that includes a bottom wall C merging into a circular upwardly extending side wall D. Ordinarily, the bottom wall C of the firebowl will include a central bearing portion E for slidably supporting a tubular centerpost F that may be elevated or lowered in consequence of manipulating an appropriate associated contrivance (not shown), but well understood in this art. A typical circular grill G, removably mounted atop the centerpost F in customary fashion, is shown in FIGURE 3. The firebowl B may be supported in various ways, such as by legs L, these being included among the components of the apparatus earlier mentioned as subject to heat and damage.

In order to insert the liner 10 into position within the firebowl, it is only necessary to lift the grill G and set it aside momentarily. The brim or annular flange portion 16 facilitates manual placement thereof, and the frusto-conical segment 18 serves as a guide to center the liner. The grill G having been replaced atop the centerpost F, barbecue operations thereafter would proceed in usual fashion. At that time, the segment 18 serves as a shield to prevent the flammable and other material in the liner from coming into contact with the bearing portion E of the firebowl, and with that portion of the centerpost F extending through said bearing.

When in place as in FIGURE 4, the liner 10 is of course supported from the bottom wall C of the firebowl, but in spaced relationship thereto via the dimple formations 20. Consequently an air space, indicated at 22, is provided between the bottom wall 12 of the liner and the bottom wall C of the firebowl. Furthermore as shown, an annular air space, indicated at 24, is provided between the side wall 14 of the liner and the side wall D of the firebowl.

With this arrangement, only a minimal amount of heat will be transmitted from the liner directly to the firebowl via the dimples 20. Consequently the firebowl B, and components of the apparatus integrated therewith below the bowl, are protected from the intense heat that would normally be transferred and tend to damage them, as should be apparent.

FIGURE 4 illustrates the removal of the liner 10 for disposal of the ashes and other residue therein, the grill G having of course been first set aside. The brim 16 serves to facilitate the lifting operation suggested by the arrows a, it being observed that said brim provides what amounts to an annular handle portion for the liner.

In view of the foregoing description and the drawings, it is believed that an adequate presentation of the features of the present invention has been given. Although said description relates to a circular liner, it will be understood that the invention is not to be specifically limited to circular liners.

Thus for example, a top plan view of a non-circular embodiment of the invention appears in FIGURE 5. The liner there appearing, is rectangular and would of course usually be employed as an accessory for a rectangular firebowl. Except for its peripheral configuration, the liner 10a embodies the same construction previously described with reference to the liner 10. Wherefore parts thereof are identified by corresponding numerals including the suffix a.

What I claim is:

In combination with the firebowl and the grill supporting counterpost of a barbecue apparatus, said firebowl including a bottom wall merging into a circular upwardly extending side wall and having a central bearing through which said centerpost extends, a removable liner for said firebowl including:
    a bottom wall that merges into a circular upstanding vertical side wall;
    a brim having an arcuate contour forming the upper edge of said side wall, said brim being disposed in a plane above that of the upper peripheral edge of the firebowl when the liner is in position therein, thus providing an annular handle portion for facilitating insertion of the liner into the firebowl and removal of said liner therefrom;
    a hollow upstanding frusto-conical segment formed centrally in the bottom wall of the liner, said conical segment serving as a shield for the bearing portion aforesaid of the firebowl and that portion of said centerpost that extends through said bearing portion; and
    a plurality of spaced depending dimple formations formed in the bottom wall of the liner providing an air space between said bottom wall of the liner and the bottom wall of the firebowl when said liner is in position within said firebowl, said dimples being formed along an imaginary centerline having a radius inwardly of said circular side wall of the liner;
    said side wall of the liner having a diameter smaller than the diameter of said side wall of the firebowl whereby to provide an annular air space between said walls when the liner is in position within said firebowl.

References Cited by the Examiner

UNITED STATES PATENTS

| | | | |
|---|---|---|---|
| 2,780,215 | 2/1957 | Vacanti | 126—25 X |
| 2,929,373 | 3/1960 | Bernstein et al. | 126—25 |
| 2,996,597 | 8/1961 | Persinger et al. | 126—25 X |
| 3,132,639 | 5/1964 | Roberts | 126—25 |
| 3,151,609 | 10/1964 | Hastings | 126—25 |
| 3,191,591 | 6/1965 | Bennett | 126—25 |

FREDERICK KETTERER, *Primary Examiner.*